No. 812,823. PATENTED FEB. 20, 1906.
H. C. CLAY.
SAWMILL FEED DRIVE.
APPLICATION FILED NOV. 13, 1905.

Witnesses
Fred. A. Duncan
J. A. Walsh

Inventor
Harry C. Clay
By
Bradford Hood
Attorneys

UNITED STATES PATENT OFFICE.

HARRY C. CLAY, OF COLUMBUS, INDIANA, ASSIGNOR TO REEVES & COMPANY, OF COLUMBUS, INDIANA, A CORPORATION OF INDIANA.

SAWMILL FEED-DRIVE.

No. 812,823.  Specification of Letters Patent.  Patented Feb. 20, 1906.

Application filed November 13, 1905. Serial No. 287,062.

*To all whom it may concern:*

Be it known that I, HARRY C. CLAY, a citizen of the United States, residing at Columbus, in the county of Bartholomew and State of Indiana, have invented certain new and useful Improvements in Sawmill Feed-Drives, of which the following is a specification.

In a sawmill construction it is necessary to provide means for driving the log-carriage past the saw first in one direction and then in the other.

The object of my invention is to provide a simple mechanism for accomplishing this driving movement, said mechanism consisting of a minimum number of parts and the arrangement being such that the driving action will tend to maintain the parts in either the forward or reverse driving engagement as soon as driving engagement has been established.

The accompanying drawings illustrate my invention.

Figure 1:
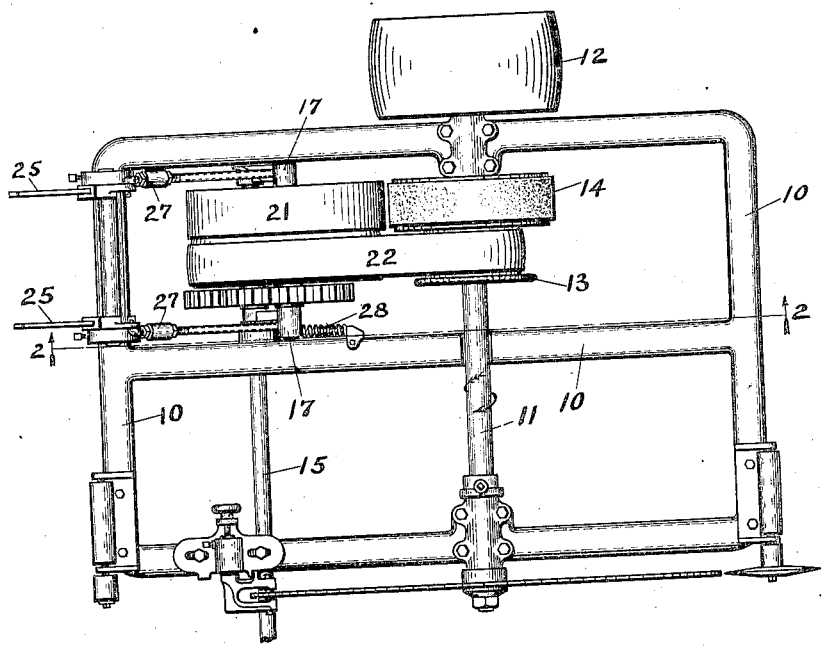
Figure 2:
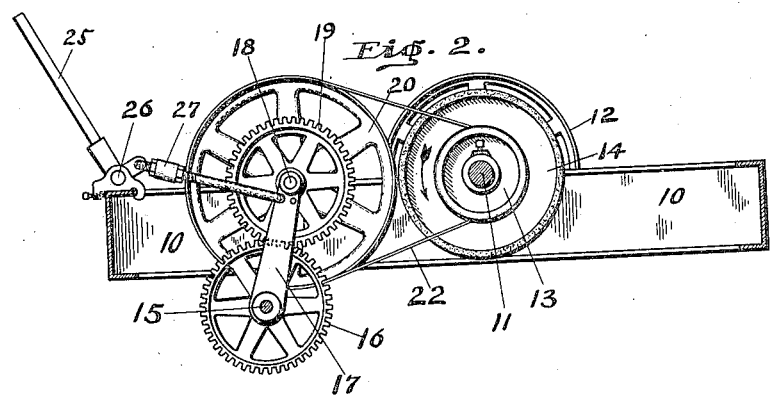

Figure 1 is a plan of one form of my invention where the forward and reverse movement of the log-carriage will be at different speeds, and Fig. 2 is a section on line 2 2 of Fig. 1.

In the drawings, 10 indicates a suitable supporting-frame, in which is journaled the saw-mandrel 11, carrying a driving-pulley 12. The mandrel 11 carries a belt-pulley 13 and a friction-pulley 14. Journaled on the main frame 10 is the shaft 15, by means of which the log-carriage is to be driven first in one direction and then in the other. Shaft 15 carries a gear 16, by means of which it is to be driven, and pivoted upon shaft 15 are two hangers 17 17, in the outer ends of which is journaled a jack-shaft 18. Secured to shaft 18 is a gear 19, which meshes with gear 16, so as to drive the same. Secured to shaft 18 is a belt-pulley 20 and a friction-pulley 21, arranged in alinement with pulleys 13 and 14, respectively. Passing over the two belt-pulleys 13 and 20 is a drive-belt 22, which is of such length that when the arms 17 are swung about shaft 15 so as to tighten the belt the pulley 21 will be out of driving engagement with the pulley 14.

Any suitable means may be provided for swinging the hangers 17—as, for instance, a hand-lever 25, carried by a rock-shaft 26, and a link 27, connecting hand-lever with the hanger; but in order that the movement may be such as not to twist the jack-shaft 18 I prefer to duplicate the hand-levers 25 and the links 27, as shown in Fig. 1.

In order to hold the jack-shaft in a neutral position, I provide a spring 28, which is sufficient to ordinarily hold the friction-pulley 21 out of engagement with the friction-pulley 14; but said spring is of such length as not to place any tension on the belt 22.

In operation suppose the saw-mandrel to be rotated in the direction indicated by the arrow. If lever 25 be swung to the right, pulley 21 will be thrown into peripheral contact with pulley 14 against the action of spring 28. This will cause pulley 21 to be rotated in a clockwise direction, and thus to rotate the feed-shaft 15 in a counter-clockwise direction. The resistance of the log-carriage to rotation of the shaft 15 will thus give the gear 19 a tendency toward planetary movement around shaft 15 in a clockwise direction, thus tending to crowd the pulley 20 farther into engagement with pulley 14. In actual practice it has been found that it is merely necessary for the operator to bring the pulley 21 into driving engagement with the pulley 14, whereupon the parts will maintain themselves in driving position against the action of spring 28 for the reasons stated. If the hand-lever 25 be moved to the left, pulley 21 will be drawn away from pulley 14 and pulley 20 away from pulley 13, thus placing the belt 22 under tension, whereupon rotation of the saw-mandrel 11 will cause rotation of the shaft 18 in a counter-clockwise direction and a consequent rotation of shaft 15 in a clockwise direction. Under such circumstances the resistance of shaft 15 will be such as to give the gear 19 a tendancy toward planetary movement about shaft 15 in a counter-clockwise direction, thus serving to further tighten the belt 22 and maintain the parts in the new driving position. It will thus be seen that the parts tend to hold themselves in driving engagement in either of the two positions, so that the operator has merely to establish the desired driving position and is not required to maintain a pressure upon the hand-lever 25.

It will be noticed that by this construction the shaft 15, as well as the saw-mandrel 11, may be mounted in fixed bearings, so that the shift from forward to reverse drive does not affect the engagement between the shaft 15 and the log-carriage.

I claim as my invention—

1. In a reversing mechanism, the combination, with a pair of main shafts, of a jack-shaft, a permanent driving connection between the first main shaft and the jack-shaft, and a belt-driving connection between the second main shaft and the jack-shaft, a frictional driving connection between the jack-shaft and the said second main shaft, and means for shifting the jack-shaft without destroying the driving connection between the same and the first main shaft to bring either the belt-drive or the friction-drive into action.

2. In a reversing mechanism, the combination, with a pair of main shafts, of a jack-shaft, a permanent driving connection between the first main shaft and the jack-shaft, and a belt-driving connection between the second main shaft and the jack-shaft, a frictional driving connection between the jack-shaft and the said second main shaft, means for shifting the jack-shaft without destroying the driving connection between the same and the first main shaft to bring either the belt-drive or the friction-drive into action, and means for normally holding the jack-shaft in a medial position.

3. In a reversing mechanism, the combination, with a pair of shafts, of a jack-shaft journaled in bearings pivoted upon the first of said shafts, a pair of meshing gears one carried by said first shaft and the other carried by the jack-shaft, a pair of friction elements one carried by the jack-shaft and the other by the second shaft, a belt-driving connection between the jack-shaft and said second shaft, and means for swinging the jack-shaft to bring either the friction-drive or the belt-drive into action.

4. In a reversing mechanism, the combination, with a pair of shafts, of a jack-shaft journaled in bearings pivoted upon the first of said shafts, a pair of meshing gears one carried by said first shaft and the other carried by the jack-shaft, a pair of friction elements one carried by the jack-shaft and the other by the second shaft, a belt-driving connection between the jack-shaft and said second shaft, means for swinging the jack-shaft to bring either the friction-drive or the belt-drive into action, and a yielding means for normally holding the jack-shaft in medial position.

In witness whereof I have hereunto set my hand and seal, at Columbus, Indiana, this 9th day of November, A. D. 1905.

HARRY C. CLAY. [L. S.]

Witnesses:
W. R. BAXTER,
W. B. DENISON.